United States Patent [19]
Tamai et al.

[11] Patent Number: 5,902,350
[45] Date of Patent: May 11, 1999

[54] GENERATING A MANEUVER AT THE INTERSECTION THROUGH A TURN LANE

[75] Inventors: Haruhisa Tamai, Saitama, Japan; Simon Desai, Sunnyvale, Calif.

[73] Assignee: Visteon Technologies, LLC, Dearborn, Mich.

[21] Appl. No.: 08/741,093

[22] Filed: Oct. 30, 1996

[51] Int. Cl.⁶ .......................... G01C 21/00; G06F 165/00
[52] U.S. Cl. ............................................. 701/211; 340/995
[58] Field of Search ...................................... 701/208, 211, 701/201; 340/995, 996

[56] References Cited

U.S. PATENT DOCUMENTS

| | | | |
|---|---|---|---|
| 3,845,289 | 10/1974 | French | 235/151.2 |
| 4,570,227 | 2/1986 | Tachi et al. | 364/444 |
| 4,608,656 | 10/1986 | Tanaka et al. | 364/449 |
| 4,611,293 | 9/1986 | Hatch et al. | 364/571 |
| 4,672,565 | 6/1987 | Kuno et al. | 364/571 |
| 4,673,878 | 6/1987 | Tsushima et al. | 324/226 |
| 4,723,218 | 2/1988 | Hasebe et al. | 364/449 |
| 4,734,863 | 3/1988 | Honey et al. | 364/449 |
| 4,751,512 | 6/1988 | Longaker | 342/357 |
| 4,782,447 | 11/1988 | Ueno et al. | 364/449 |
| 4,796,191 | 1/1989 | Honey et al. | 364/450 |
| 4,797,841 | 1/1989 | Hatch | 364/571.04 |
| 4,831,563 | 5/1989 | Ando et al. | 364/571.05 |
| 4,862,398 | 8/1989 | Shimizu et al. | 364/571.05 |
| 4,882,696 | 11/1989 | Nimura et al. | 364/449 |
| 4,914,605 | 4/1990 | Loughmiller, Jr. et al. | 364/518 |
| 4,918,609 | 4/1990 | Yamawaki | 364/449 |
| 4,926,336 | 5/1990 | Yamada | 364/444 |
| 4,937,570 | 6/1990 | Matsukawa et al. | 340/905 |
| 4,937,753 | 6/1990 | Yamada | 364/449 |
| 4,964,052 | 10/1990 | Ohe | 364/449 |
| 4,970,652 | 11/1990 | Nagashima | 364/449 |
| 4,982,332 | 1/1991 | Saito et al. | 364/449 |
| 4,984,168 | 1/1991 | Neukrichner et al. | 364/449 |
| 4,989,151 | 1/1991 | Nuimura | 364/449 |
| 4,992,947 | 2/1991 | Nimura et al. | 364/444 |
| 4,996,645 | 2/1991 | Schneyderberg Van DerZon | 364/449 |
| 4,999,783 | 3/1991 | Tenmoku et al. | 364/450 |
| 5,040,122 | 8/1991 | Neukirchner et al. | 364/449 |
| 5,046,011 | 9/1991 | Kakihara et al. | 364/449 |
| 5,060,162 | 10/1991 | Ueyama et al. | 364/449 |
| 5,121,326 | 6/1992 | Moroto et al. | 364/449 |
| 5,177,685 | 1/1993 | Davis et al. | 364/443 |
| 5,206,811 | 4/1993 | Itoh et al. | 364/449 |
| 5,283,743 | 2/1994 | Odagawa | 364/457 |
| 5,287,297 | 2/1994 | Ihara et al. | 364/571.02 |
| 5,297,050 | 3/1994 | Ichimura et al. | 364/444 |
| 5,371,497 | 12/1994 | Nimura et al. | 340/995 |
| 5,398,189 | 3/1995 | Inoue et al. | 364/449 |
| 5,406,492 | 4/1995 | Suzuki | 364/449 |
| 5,410,486 | 4/1995 | Kishi et al. | 364/449 |

FOREIGN PATENT DOCUMENTS

| | | | |
|---|---|---|---|
| 0689034A1 | 12/1995 | European Pat. Off. | G01C 21/20 |
| 0703434A2 | 3/1996 | European Pat. Off. | G01C 21/20 |
| 4035979A1 | 11/1990 | Germany | G08G 1/0968 |
| WO 96/06326 | 2/1996 | WIPO . | |

OTHER PUBLICATIONS

Anselm Spoerri, "Novel route Guidance Displays," 1993, Ottawa, *IEEE*.

French, *MAP matching Origins Approaches and Applications*, Rober L. French & Associates, 3815 Lisbon St., Suite 201, Forth Worth, Texas 76107, USA, pp. 91–116. No Date.

*Primary Examiner*—Michael Zanelli
*Attorney, Agent, or Firm*—Joseph M. Villeneuve; Beyer & Weaver, LLP

[57] ABSTRACT

The present invention provides a method and apparatus for generating a maneuver indication for an intersection having a turn-lane connector which is consistent with what a driver sees and expects. According to one aspect of the invention, it provides a method for providing maneuver indications to a driver for an intersection having a turn-lane connector which includes the steps of (a) determining when the intersection includes a turn-lane connector, (b) determining whether it is appropriate to collapse the turn lane into the main portion of the intersection for the purposes of generating a maneuver indication, (c) collapsing the turn lane into the intersection when it is appropriate, (d) generating a maneuver indication for the collapsed intersection, and (e) outputting the maneuver indication to the user in time so that the driver may use the turn-lane connector if desired.

17 Claims, 17 Drawing Sheets

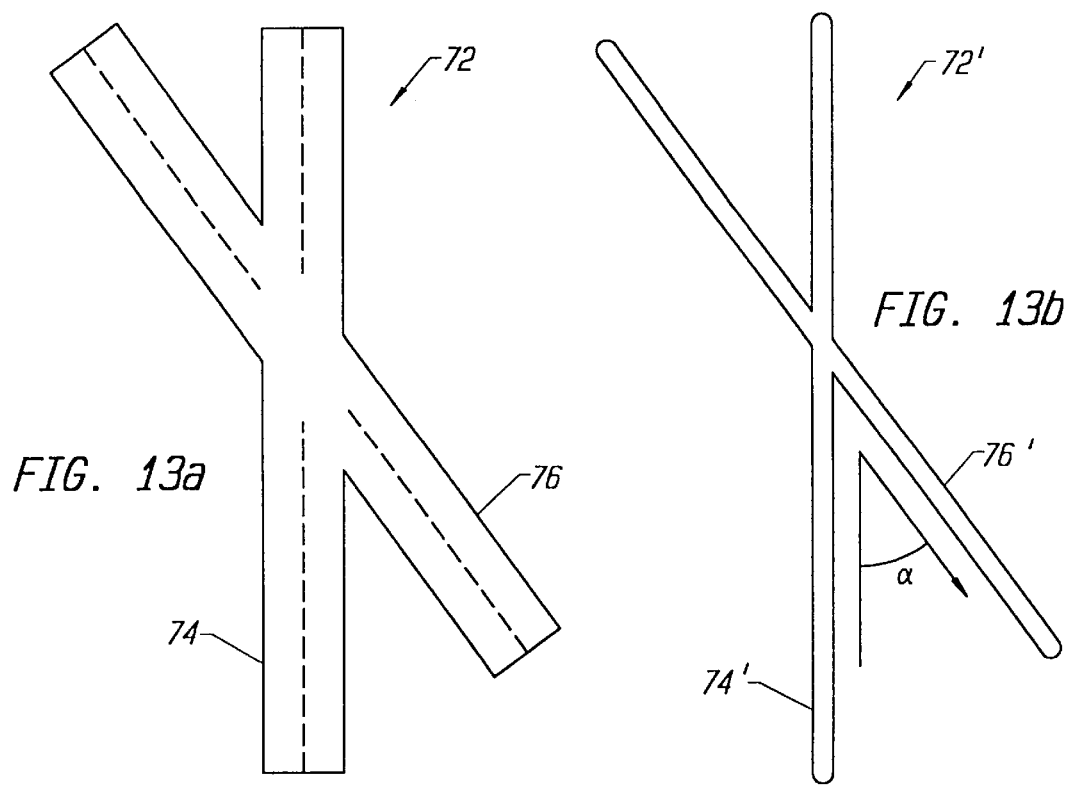
FIG. 13a
FIG. 13b
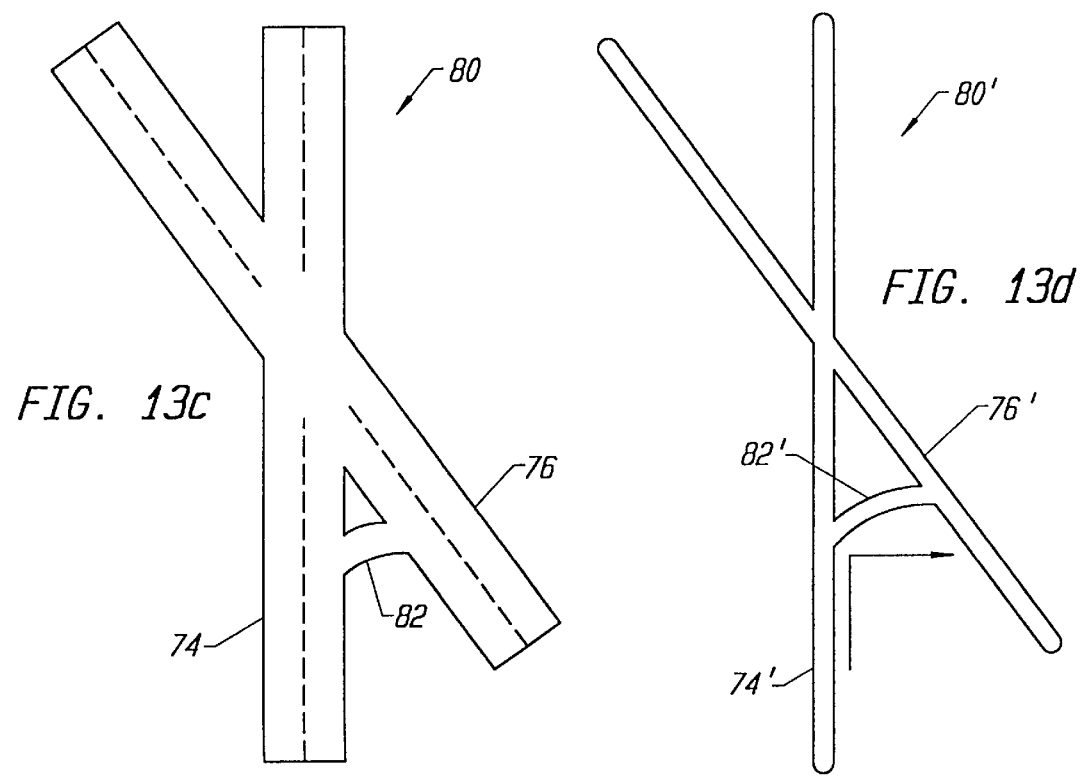
FIG. 13c
FIG. 13d

GENERATING A MANEUVER AT THE INTERSECTION THROUGH A TURN LANE

BACKGROUND OF THE INVENTION

The present invention relates generally to vehicle navigation systems. More specifically, the invention relates to methods and apparatus for generating maneuvers for an intersection having a turn-lane connector.

A conventional vehicle navigation system generates route and direction information to a driver. To provide the route information, the conventional vehicle navigation system includes a route generator, or equivalent, which reviews a map database and calculates a route based on a provided source and destination. To provide direction information, the conventional vehicle navigation system also includes a maneuver (or direction) processor, or equivalent, which monitors the vehicle's location with respect to the generated route and provides maneuver indications to the driver, as appropriate, directing the driver to the desired destination.

The operation of a conventional maneuver processor is described in the following. When the generated route includes a turn at the intersection of two roads, for example, the maneuver processor provides a turn indication to the driver as the vehicle approaches the intersection according to the general direction of the turn (e.g., left or right) and the angle between the entry road and the exit road as represented in the map database. For example, where the general direction of the turn is "right" and the angle between the entry street and the exit street is approximately 90 degrees, the maneuver processor provides a simple "right turn" indication to the driver. Where, on the other hand, the angle between the entry and exit roads is much greater than (or less than) 90 degrees, the maneuver processor provides a "slight right turn" ("hard right turn") or "keep right" ("sharp right") maneuver indication instead. The maneuver processor also provides the name of the exit road to facilitate the correct execution of the maneuver.

The maneuver indication provided to the driver may be in various forms, including, but not limited to, a pre-recorded voice prompt, a visual icon provided on a display device, highlighted text provided on a display, or some combination of the above. The maneuver processor also includes means for ensuring that the maneuver indication is provided to the driver sufficiently in advance of when the maneuver is required.

When the generated route includes navigating through an intersection that is relatively complex as compared to the simple example described above, the driver requires a maneuver indication which is unambiguous, which suggest to the driver how the maneuver is to be executed, and which is consistent with what the driver observes at the intersection. Accordingly, the conventional maneuver processor is adapted to provide a maneuver indication that reflects as closely as possible the actual arrangement of roads at an intersection. This requirement is typically satisfied by providing a maneuver indication which corresponds in angle or shape with the maneuver to be performed by the driver. In some embodiments, this capability is manifest by providing a maneuver indication which includes highlighted portions of a map. In other embodiments, the maneuver indication includes one or more displayed icons which closely approximate the turn angles of the maneuver.

Occasionally, the capability of the conventional maneuver processor to provide a maneuver indication that closely reflects the actual arrangement of roads at the intersection causes it to provide a maneuver indication that includes unnecessary or redundant information, or that is inconsistent with what the driver actually sees as he/she approaches the intersection. An example of this is depicted in FIGS. 1(a) and (b).

FIG. 1(a) is a representation of an intersection 10 comprising cross-streets, 12 and 14, depicted as N/S street 12, and E/W street 14, respectively. Intersection 10 also includes a turn-lane 16 that connects the northbound traffic on N/S street 12 to the eastbound traffic of E/W street 14. The intersection 10 is represented in the map database as shown in FIG. 1(b), including a road 12' corresponding to N/S street 12, a road 14' corresponding to E/W street 14, and a connector 16' corresponding to turn lane 16. In this case, the conventional maneuver processor operating in the manner described above generates a double maneuver indication for a right turn through the intersection as shown in the figure. That is, the maneuver processor generates a "slight right" indication 18, or its equivalent, for the maneuver from road 12' onto connector 16', followed immediately by a second "slight right" indication 20, or its equivalent, for the maneuver from connector 16' onto road 14'.

When the distance between the entry of turn lane 16 and the junction of cross-streets 12 and 14 is relatively short, the driver approaching intersection 10 from the south only sees the junction of E/W street 14 with N/S street 12, and does not see the turn lane 16. So, when the double maneuver indication is provided in advance of the intersection, the driver is confused by the maneuver indications which do not match the driver's perspective. The driver's confusion is exacerbated by the fact that the turn lane 16 usually has no road name (i.e., the first "slight right" maneuver indication provides no exit road name for the driver). Therefore, it would be preferable in this case for the maneuver processor to provide a simple "right turn" indication to the driver indicating a maneuver from N/S street 12 onto E/W street 14 regardless of whether or not the driver uses the turn lane.

Another case where the conventional maneuver processor provides a maneuver indication including unnecessary or redundant information, or that is inconsistent with what the driver actually sees upon approaching the intersection is depicted in FIGS. 2(a) and (b). FIG. 2(a) is a representation of a three-way "T" intersection 22 comprising N/S street 24 and abutting street 26. As shown in the figure, N/S street 24 includes a median 28 and a turn lane 30 for allowing access to abutting street 26 from the northbound portion of N/S street 24. The intersection 22 is represented in the map database as shown in FIG. 2(b), which includes a road 24' corresponding to the northbound portion of N/S street 24, a road 24" corresponding to the southbound portion of N/S street 24, a road 26' corresponding to abutting road 26, and a connector 30' corresponding to turn lane 30. In this case, the conventional maneuver processor generates a double maneuver indication for a left turn from N/S Street 24 onto abutting street 26 as shown in the figure. That is, the maneuver processor generates a "slight left" indication 32, or its equivalent, for the maneuver from road 24' onto connector 30', followed immediately by a second "slight left" indication 34, or its equivalent, for the maneuver from connector 30' onto road 26'. As can now be appreciated by the reader, the double maneuver indication is potentially confusing to the driver. Therefore, it would be preferable in this case for the maneuver processor to provide a simple "left turn" indication to the driver indicating a maneuver from the northbound lane of N/S Street onto abutting street 26.

Another case where the conventional maneuver processor provides a maneuver indication which includes unnecessary or redundant information, or which does not conform with what the driver actually sees is depicted in FIGS. 3(a) and (b). FIG. 3(a) is a representation of an intersection 36 including N/S street 38, east street 40, and west street 42. N/S street includes a median 44. The intersection 36 is represented in the map database as shown in FIG. 3(b) which includes a road 38' corresponding to the northbound portion of N/S street 38, a road 38" corresponding to the southbound portion of N/S Street 38, a road 40' corresponding to east street 40 which abuts road 38' and which connects road 38' to road 38", and a road 42' corresponding to west street 42 which abuts road 38". In this case, the conventional maneuver processor provides a double maneuver indication for a left turn from the northbound portion of N/S street 38 as shown in the figure. That is, the conventional maneuver processor provides a "left turn" indication 46, or its equivalent, for the maneuver from road 38' to a connecting portion of road 40', followed immediately by a "straight" indication 48, or its equivalent, to indicate the passage from the connecting portion of road 40' onto road 42'. As can now be appreciated by the reader, the double maneuver indication includes information which is redundant and unnecessary. (A similar problem occurs when, as shown by the dashed-line, the conventional maneuver processor provides a double maneuver indication for a U-turn from the northbound portion of N/S street 38 [i.e., road 38'] onto the southbound portion of N/S street 38 [i.e., road 38"].) It would be preferable in this case for the maneuver processor to provide a simple "left turn" (or "U-turn") indication to the driver indicating a maneuver from the northbound portion of N/S street 38 onto West street 42.

FIGS. 4(a) and (b), depict yet another case where the conventional maneuver processor provides a maneuver indication which includes unnecessary or redundant information, or which does not conform with what the driver actually observes at the intersection. FIG. 4(a) is a representation of street 50 wherein the northbound portion of the street 52 is separated from the southbound portion of the street 54 by a median 56. The street 50 is represented in the map database as shown in FIG. 4(b), which includes a road 52' corresponding the northbound portion of the street 52, a road 54' corresponding to the southbound portion of the street 54, and a connector 58 between them representing a U-turn lane. In this case, the conventional maneuver processor generates a double maneuver indication for a U-turn as shown in the figure. That is, the conventional maneuver processor provides a "left turn" indication 60, or its equivalent, for the maneuver from road 52' onto connector 58, followed immediately by another "left turn" indication 62, or its equivalent, for the maneuver from connector 58 onto road 54'. Here, as the reader can appreciate, it would be preferable in this case for the maneuver processor to provide a simple "U turn" indication, or its equivalent.

SUMMARY OF THE INVENTION

The present invention provides a method and apparatus for generating a maneuver indication for an intersection having a turn-lane connector which is consistent with what a driver sees and expects. It solves the problem recognized herein by collapsing the turn-lane connector into the main part of intersection, when appropriate, for the purpose of generating a maneuver indication for the driver.

According to one aspect of the invention, it provides a method for providing maneuver indications to a driver for an intersection having a turn-lane connector which includes the steps of (a) determining whether the intersection includes a turn-lane connector, (b) when the intersection includes a turn lane connector, determining whether it is appropriate to collapse the turn lane into the main portion of the intersection for the purposes of generating a maneuver indication, (c) collapsing the turn lane into the intersection when it is appropriate, (d) generating a maneuver indication for the collapsed intersection, and (e) outputting the maneuver indication to the user in time so that the driver may use the turn-lane connector if desired. According to another aspect of the intention, it includes an apparatus for practicing the above-described method. These and other aspects of the invention will become apparent to one of ordinary skill in the art by reference to the remaining portions of the specification and the drawings.

BRIEF DESCRIPTION OF THE DRAWINGS

FIGS. 13(a)–13(d) are representations of two intersections for demonstrating a method of generating one or more maneuver indications which correspond to the driver's perspective of the intersection according to the present invention;

DESCRIPTION OF THE PREFERRED EMBODIMENT

Figure 5:
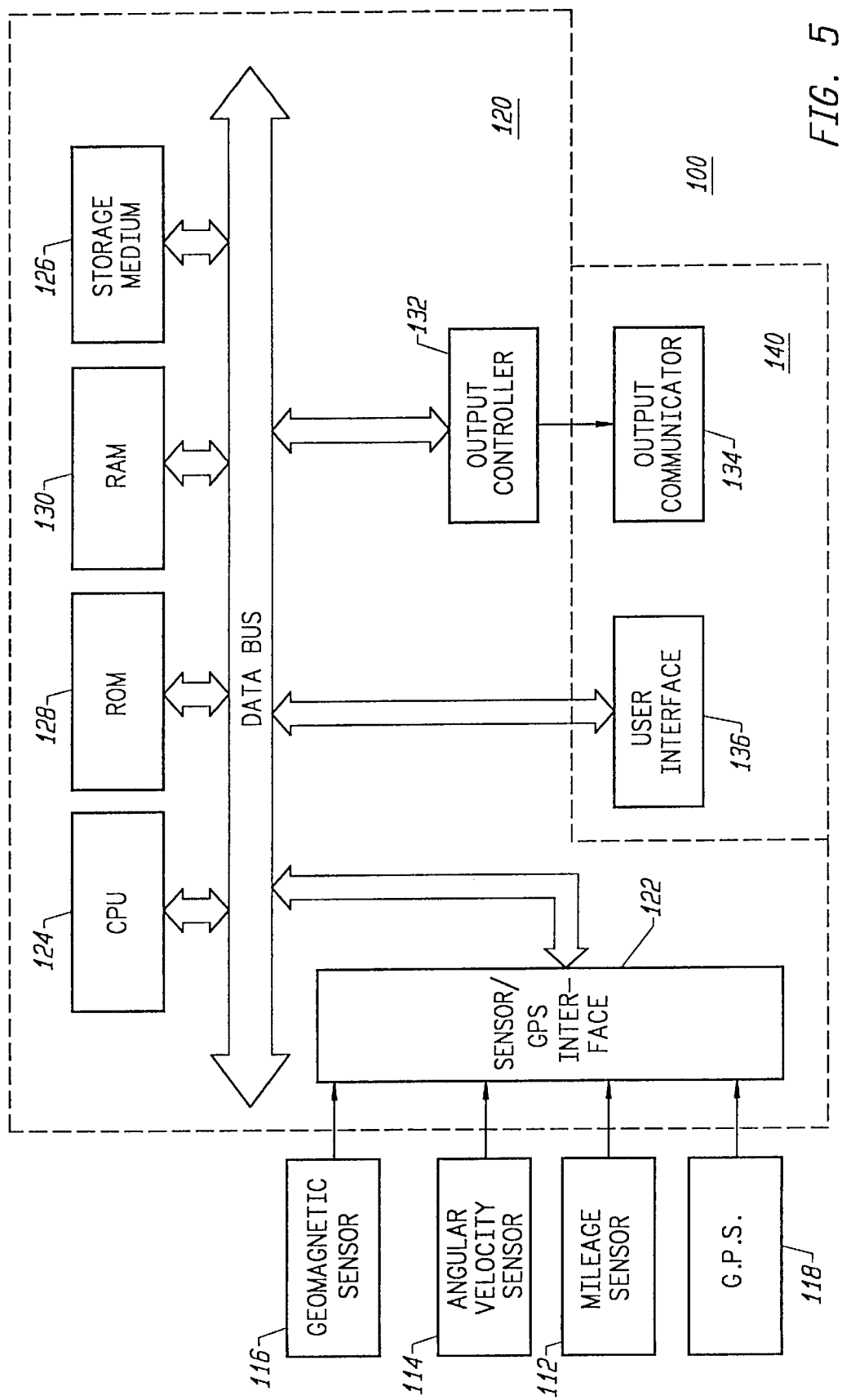
FIG. 5 is a block diagram of a vehicle navigation system for use with the present invention.

FIG. 5 is a block diagram of a vehicle navigation system 100 for use with the present invention. Sensors 112 to 116 and GPS receiver 118 are coupled to computing means 120 through sensor/GPS interface 122. In typical embodiments, the mileage sensor 112 comprises an odometer; the angular velocity sensor 114 comprises a gyroscope, or a differential odometer coupled to the wheels of the vehicle; and the geomagnetic sensor 116 usually comprises a magnetic compass mounted in the vehicle. A global positioning system (GPS) data receiver 118 is provided for receiving signals from, for example, a satellite-based navigation system. Data from sensor/GPS interface 122 is transmitted to CPU 124, which performs calibration, signal processing, dead-reckoning, vehicle positioning, route generating, and maneuver processing functions. A database containing map information is stored in storage medium 126, with software directing the operation of computing means 120 stored in ROM 128 for execution by CPU 124. RAM 130 permits reading and writing of the information necessary to execute such software programs. Storage medium 126 may comprise a hard disk drive, CD-ROM or integrated circuit onto which digitized map information has been stored. Output controller 132, which may comprise a graphics controller, receives data processed by CPU 124 and transmits such data to output communicator 134, usually comprising a display screen. The user may input data, such as a desired destination, through user interface 136, typically comprising a keyboard.

The map database stored in storage medium 126 preferably comprises positional data such as, for example, latitude and longitude coordinates, for describing road intersections, road segments, landmarks and points of interest, and other geographical information. The data base further comprises road attribute data identifying characteristics of roads or places on the map, including, but not limited to, road and place names; road features such as dividers, one-way restrictions, surface, speed limit, shape, elevation; and road classifiers such as freeway, expressway, artery, street, access, and connector, for example. Given a source and a destination, the vehicle navigation system uses the map database to generate a route to the destination and to provide maneuver indications directing the driver to the desired destination.

A maneuver processor (not shown) is represented by computing means 120. In particular, it is represented by CPU 124 operating in conjunction with software and data stored in ROM 128, RAM 130 and storage medium 126.

Figure 6:
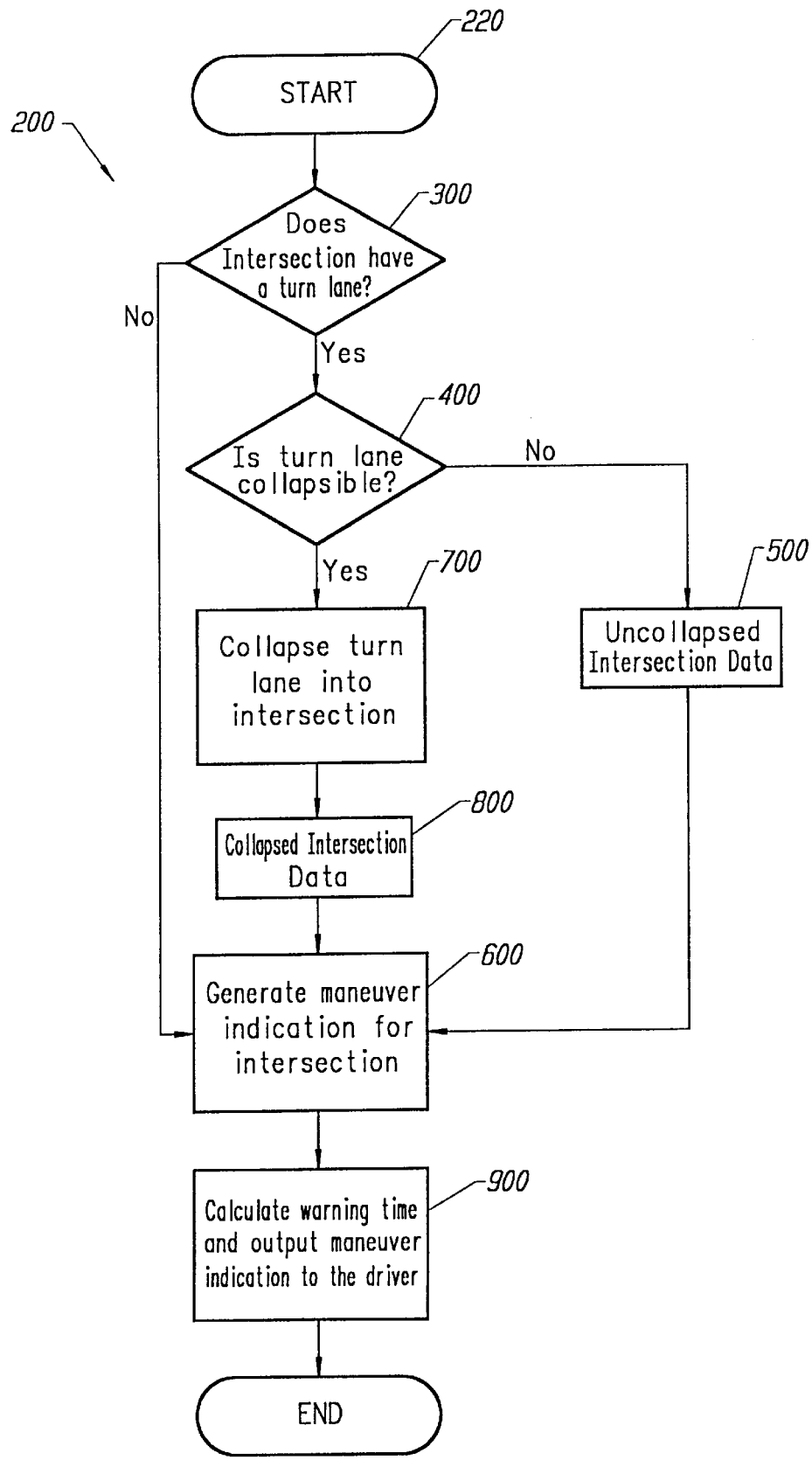
FIG. 6 is a flow-chart of a method for generating one or more maneuver indications for an intersection having a turn-lane connector according to the present invention.

FIG. 6 is a flow chart of a method 200 for generating a maneuver indication for an intersection having a turn-lane connector according to the present invention. The portions of the flow chart with dark shading are described in further detail later in the specification.

Figure 1A:
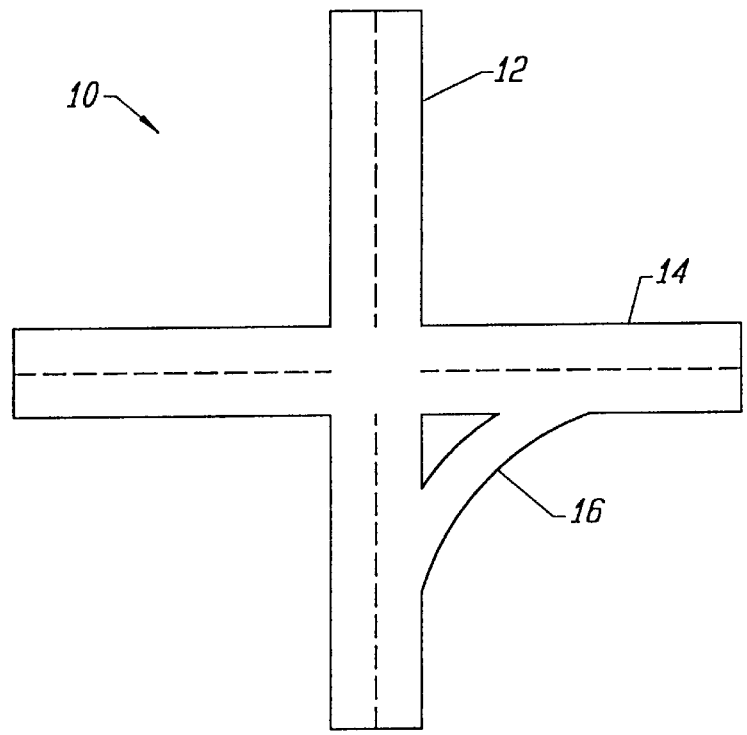
FIGS. 1(a) and 1(b) are representations of an intersection comprising two cross-streets and a turn lane connector for which the conventional maneuver processor generates a double-maneuver indication that is confusing to the driver.

A step 220 is the entry point for the method 200. At a step 300, the maneuver processor determines whether the intersection for which a maneuver indication is to be provided includes a turn-lane connector. If so, then the maneuver processor determines at a step 400 whether the turn-lane connector is collapsible. That is, the maneuver processor determines whether the turn-lane connector can be collapsed into the main portion of the intersection (i.e., the junction defined by cross-streets 12 and 14 shown in FIG. 1(a), for example) for the purposes of maneuver generation.

If it is determined that the turn-lane is not collapsible, then the maneuver processor forwards the positional data and road attribute data corresponding to the uncollapsed intersection 500 to a step 600. If, however, the maneuver processor determines at step 400 that the turn-lane connector is collapsible, then at step 700, maneuver processor collapses the turn-lane connector into the main portion of the intersection. That is, the maneuver modifies the positional data and road attribute data for the uncollapsed intersection so that the turn lane connector is collapsed into the junction of main roads defining the intersection. Collapsing the intersection produces collapsed intersection data 800 which is forwarded to step 600 instead.

At step 600, the maneuver processor generates the maneuver indication for the intersection based on the positional and road attribute data provided from steps 400 or 700, accordingly. At step 900, the maneuver processor calculates a warning time and outputs a maneuver indication to the user at the warning time so that the user may utilize the turn-lane connector, if desired.

Figure 1B:
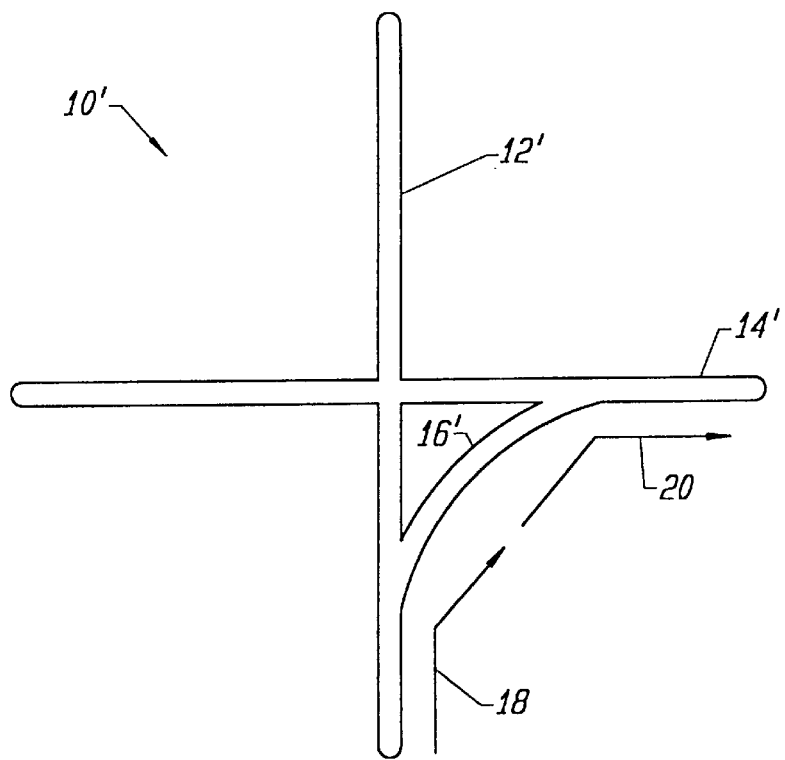
Figure 2A:
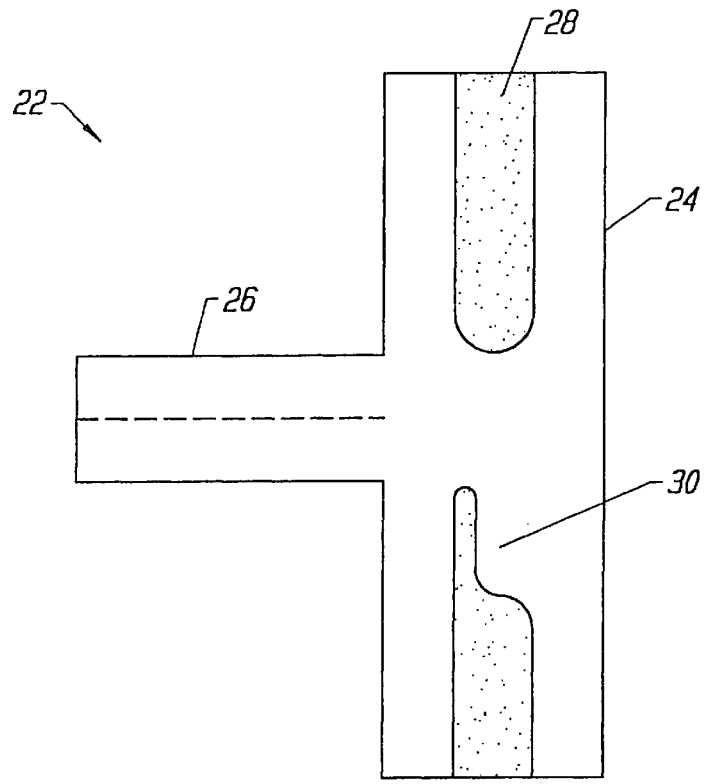
FIGS. 2(a) and 2(b) are representations of a three-way "T" intersection comprising a divided roadway, an abutting street, and a turn-lane connector for which the conventional maneuver processor generates a double-maneuver indication that is confusing to the driver.
Figure 2B:
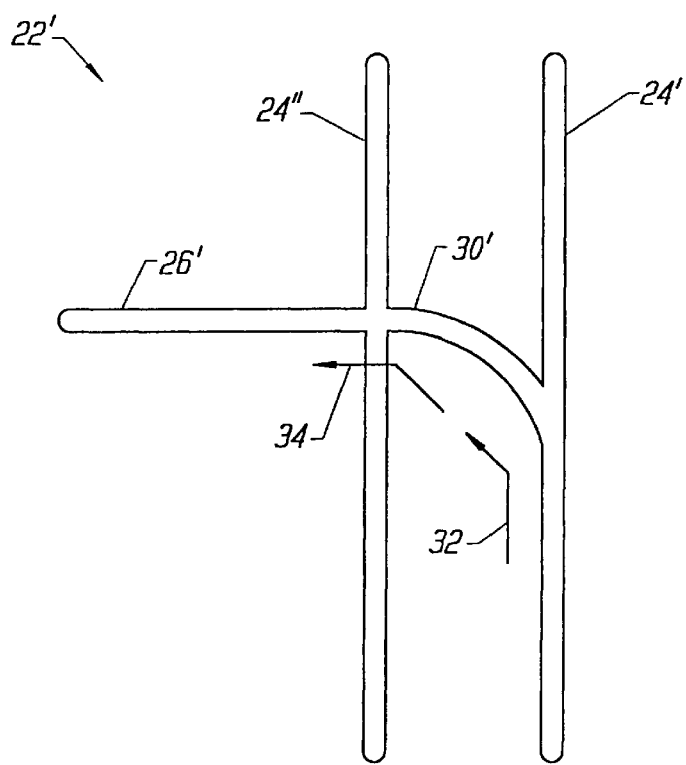
Figure 7:
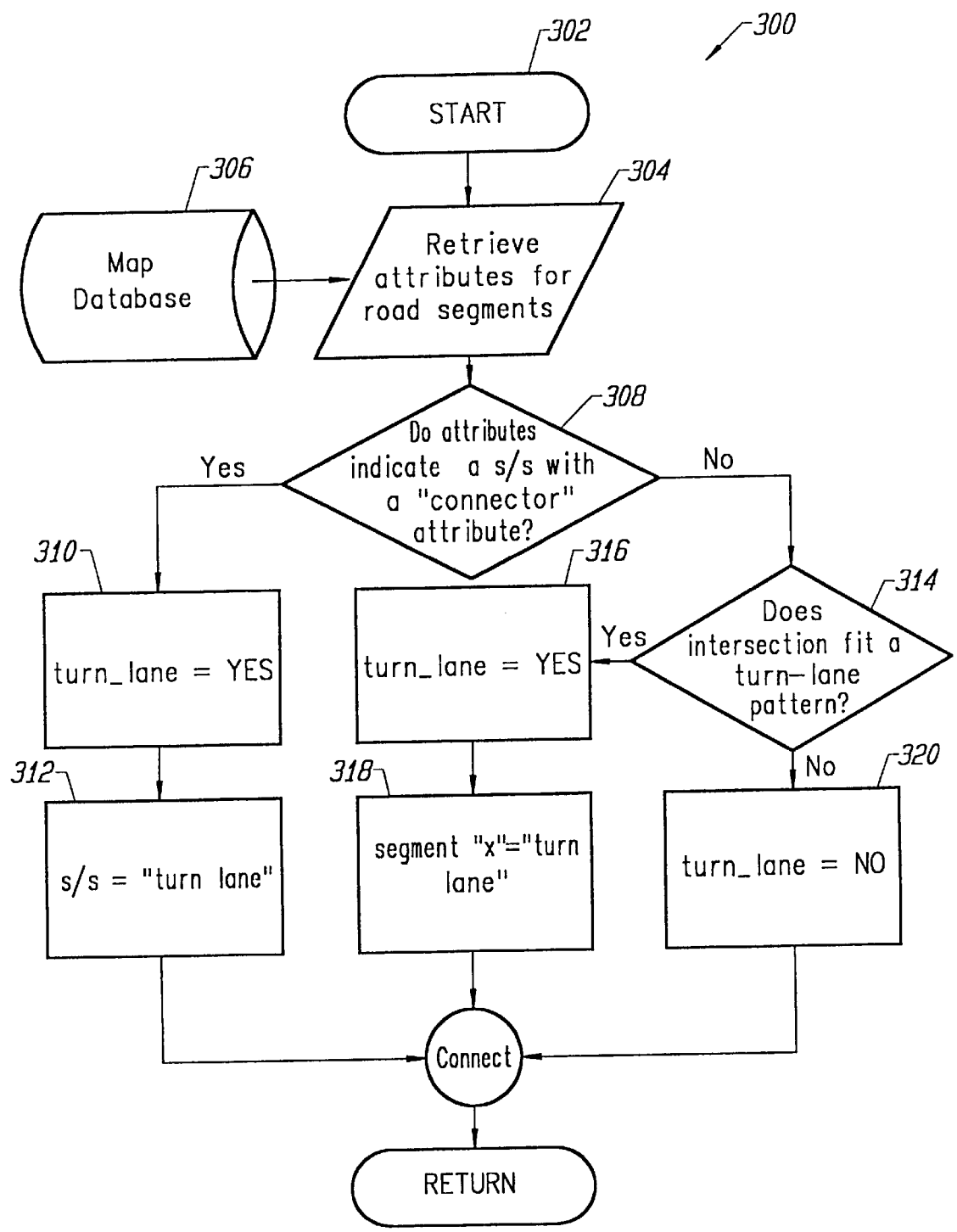
FIG. 7 is a flow chart of a method for determining whether the intersection includes a turn-lane connector according to the present invention.

FIG. 7 is a flow chart of the method 300 for determining whether the intersection includes a turn-lane connector. A step 302 is an entry point for the method 300. At a step 304, the maneuver processor retrieves from a map database 306 the positional data and road attribute data for the road segments comprising the intersection. The maneuver processor next determines at a step 308 whether the positional and/or road attribute data indicates that the intersection includes a short road segment having "turn-lane" characteristics. For example, in one embodiment of the present invention, when one of the road segments of the intersection is a short segment (e.g., segment 16' of FIG. 1(b)) for which the associated road attribute data includes a "connector" attribute, or equivalent, which identifies it as a turn lane, step 308 merely comprises the step of recognizing that the intersection includes a short-segment having a "connector" attribute. In other embodiments, the maneuver processor determines whether a given intersection includes a turn lane by reviewing several components of the positional and road attribute data for the intersection including, but not limited to, the arrangement of the segments, the length of each segment in the intersection, and whether or not the intersection includes a short segment having a "one-way" attribute. When the road attribute and/or the positional data indicates that the short segment is a turn lane connector, the maneuver processor indicates at a step 310 that the intersection includes a turn lane by, for example, setting a "turn_lane" variable to a "YES" value. The maneuver processor also indicates at step 312 that the short segment is a turn lane for further processing.

When, on the other hand, it cannot be conclusively established from the road attribute and/or positional data that the intersection includes a short segment having turn lane characteristics, then at a step 314 the maneuver processor employs a pattern recognition technique to determine whether the intersection includes a turn lane connector. If so, then maneuver processor indicates at step 316 that the intersection includes a turn lane by, for example, setting the "turn_lane" variable to a "YES" value as in step 310. At a step 318, the maneuver processor also identifies the road segment or sub-segment which corresponds to the turn lane. If, however, the pattern recognition technique does not indicate that the intersection includes a turn lane, then the maneuver processor so indicates at a step 320 by, for example, setting the "turn_lane" variable to a "NO" value.

Figure 8:
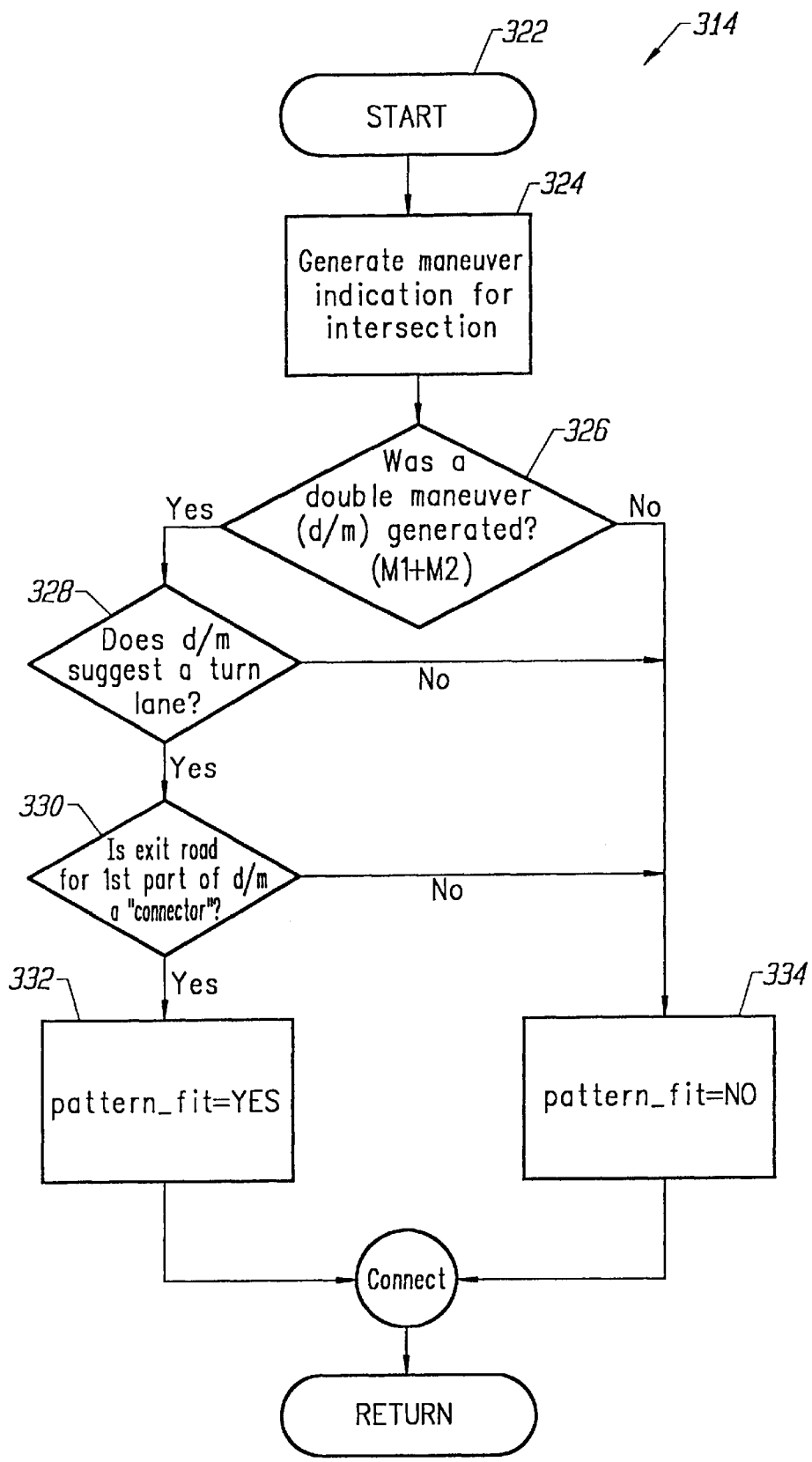
FIG. 8 is a flow-chart of a method for pattern recognition of an intersection having a turn-lane connector according to the present invention.
Figure 9:
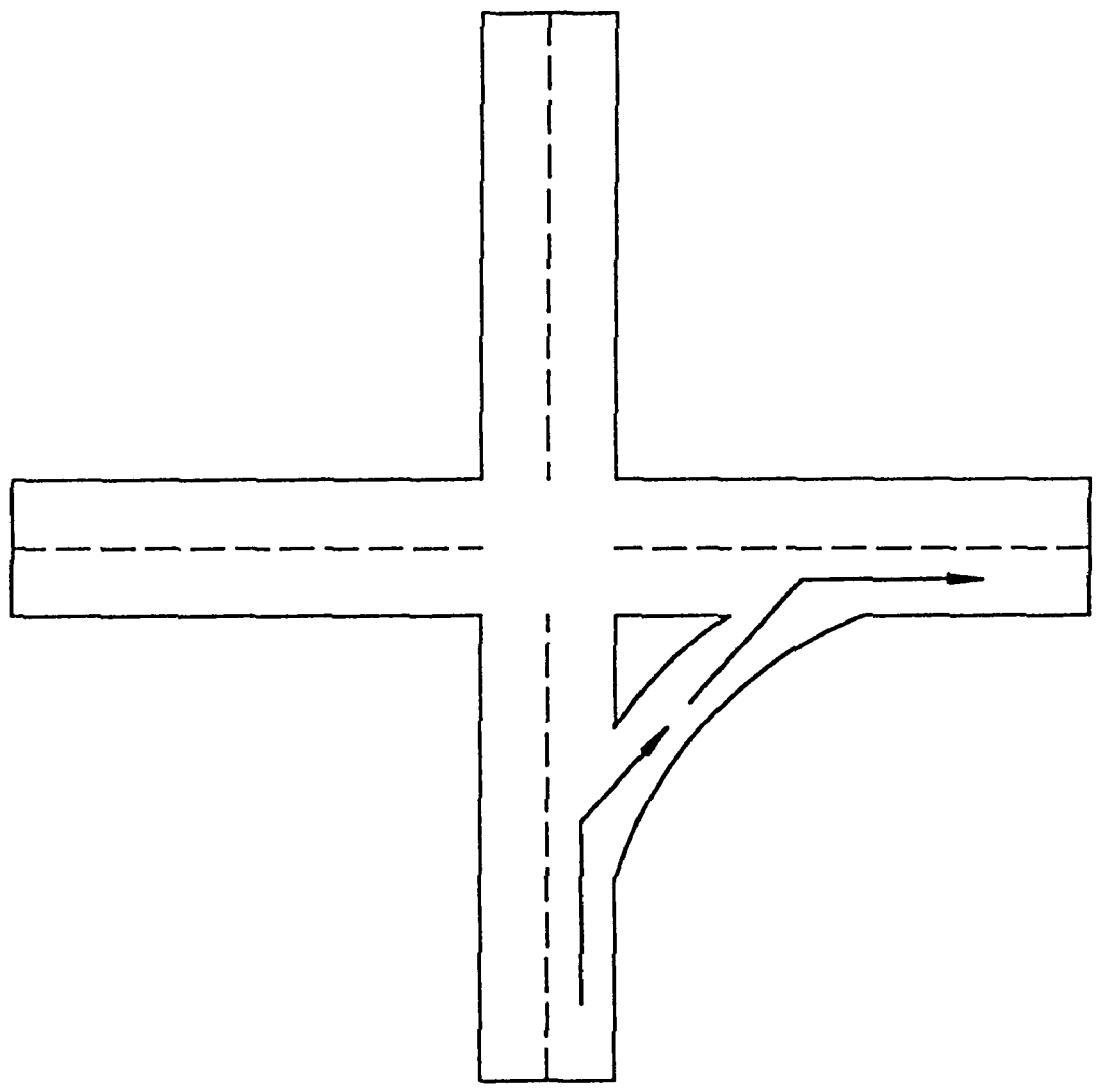
FIG. 9 is a representation of an intersection having a turn-lane connector for demonstrating the method of FIG. 8.

FIG. 8 is a flow-chart describing a method for pattern recognition 314 according the present invention. FIG. 9 is a representation of an intersection having a turn-lane connector for demonstrating the method of FIG. 8. A step 322 is an entry point for the method 300. The maneuver processor generates a maneuver indication for the uncollapsed intersection at a step 324. The generated maneuver indication is then reviewed at steps 326 to determine whether a double maneuver was generated as shown in FIG. 8. If so, then at step 328, the maneuver processor determines from the double maneuver and the arrangements of roads at the intersection whether the double maneuver was one which suggests that the intersection includes a turn lane connector (e.g., a "slight right" indication, or equivalent, immediately followed by a second "slight right" indication, or equivalent; a "left turn" indication, or equivalent, immediately followed by a "straight" indication, or equivalent; a "left turn" indication, or equivalent, immediately followed by another "left turn" indication, or equivalent).

Figure 3A:
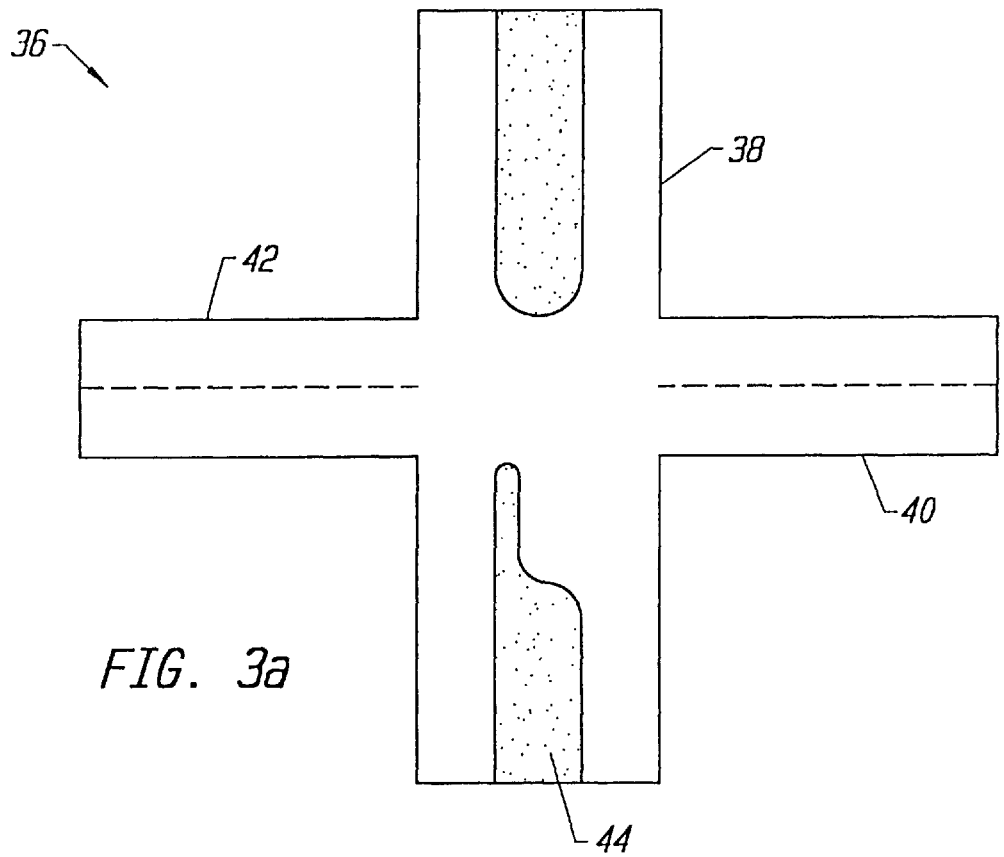
FIGS. 3(a) and 3(b) are representations of an intersection comprising a divided roadway, a crossroad intersecting the divided roadway from one side, and another crossroad abutting the divided roadway on the other side for which the conventional maneuver processor generates a double-maneuver indication that is confusing to the driver.
Figure 3B:
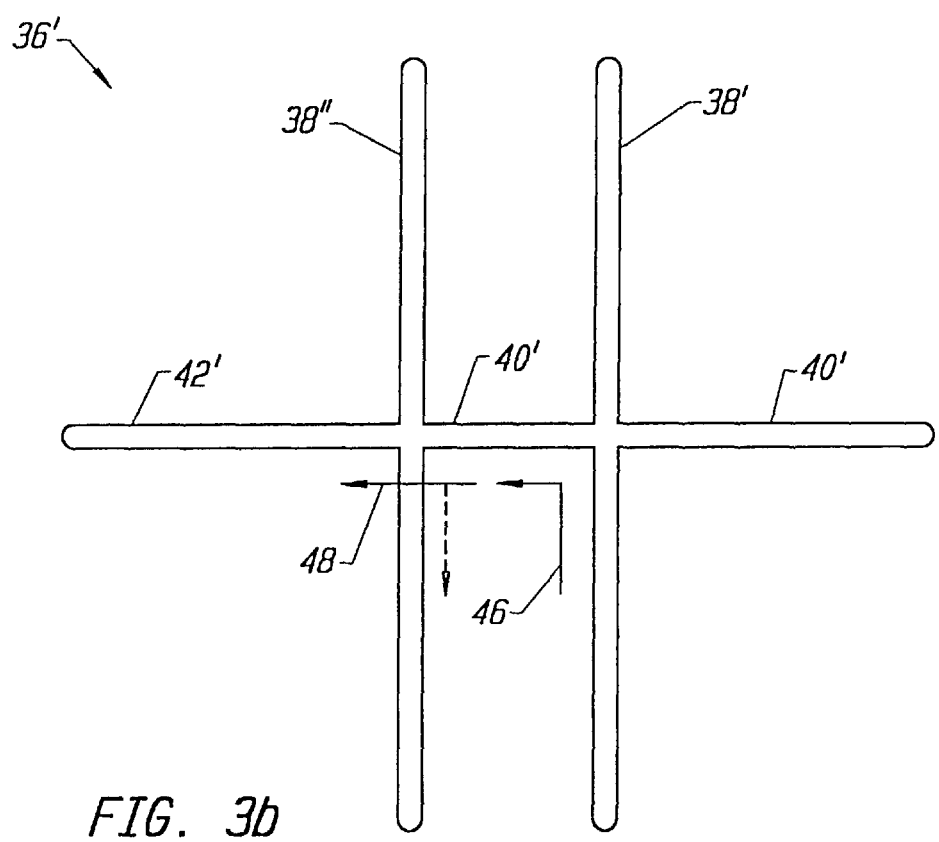
Figure 4A:
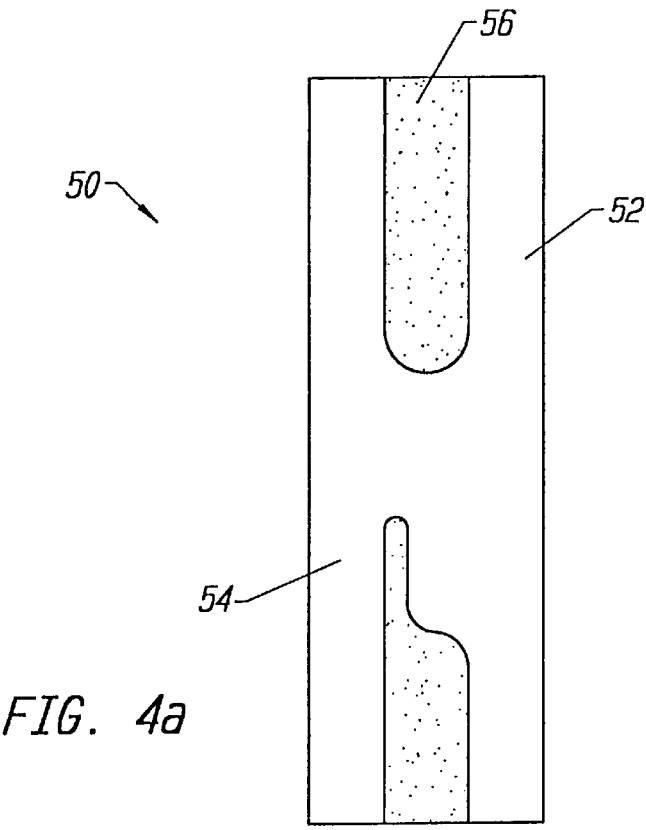
FIGS. 4(a) and 4(b) are representations of a divided roadway having a break in the median for executing a U-turn for which the conventional maneuver processor generates a double-maneuver indication that is confusing to the driver.
Figure 4B:
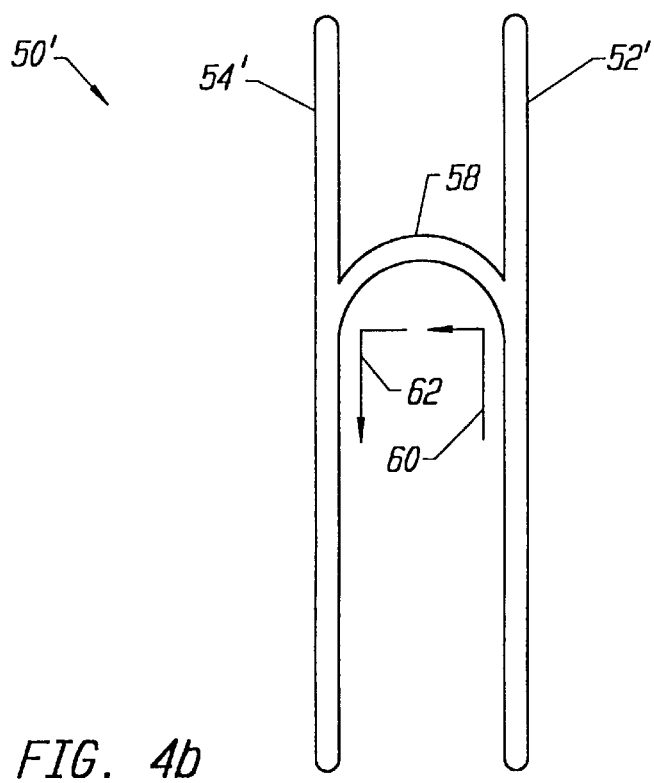

When these first two tests are satisfied, the maneuver processor determines at step 330 whether the exit road for the first part of the double maneuver is a short road segment or sub-segment which merely acts as a connector between two or more primary road segments. This is done by testing a variety of criteria. For example, in the case shown in FIG. 9, the purported turn-lane shown in the figure typically has a "one-way" road attribute associated with it in the map database. In this case, the maneuver processor determines that the short segment is a connector by merely recognizing the "one-way" attribute. Referring again to FIG. 3(b), however, there is shown a short segment 40' between the northbound and southbound portions of N/S street that is two-way. In this case, the maneuver processor determines that the portion of road segment 40' between roads 38' and 38" is a merely a connector for roads 38' and 38" by recognizing that N/S road 38 is "double-digitized" (i.e., represented in the database by two separate roads running in parallel). Often, when a road is double-digitized, an attribute is provided in the map database to indicate this fact. Hence, the maneuver processor merely recognizes the "double-digitized" attribute in the map database. When no such attribute is provided, however, the maneuver processor can nonetheless determine that the road is "double-digitized" by recognizing that the two roads (e.g., road 38' and road 38") have the same road name.

When all three of these tests are satisfied, the maneuver processor indicates that the intersection corresponds to an intersection having a turn lane at a step 332 by, for example, setting a "pattern_fit" variable to a "YES" value. If, on the other hand, any of the foregoing tests are not satisfied, then the maneuver processor indicates at step 334 that the intersection does not correspond to one having a turn lane by, for example, setting the "pattern_fit" variable to a "NO" value.

Figure 10:
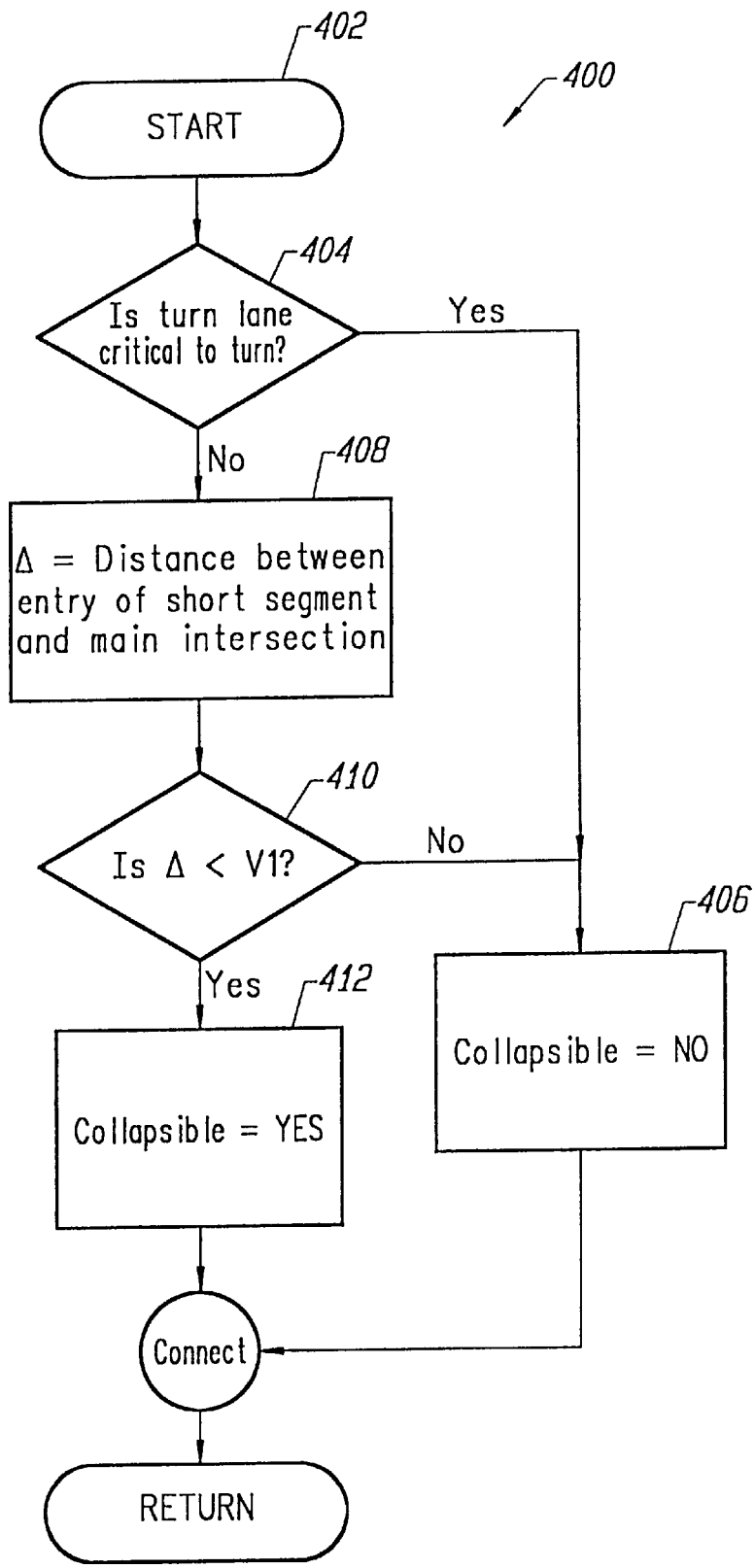
FIG. 10 is a flow-chart of a method for determining whether a turn-lane connector is collapsible according to the present invention.
Figure 11A:
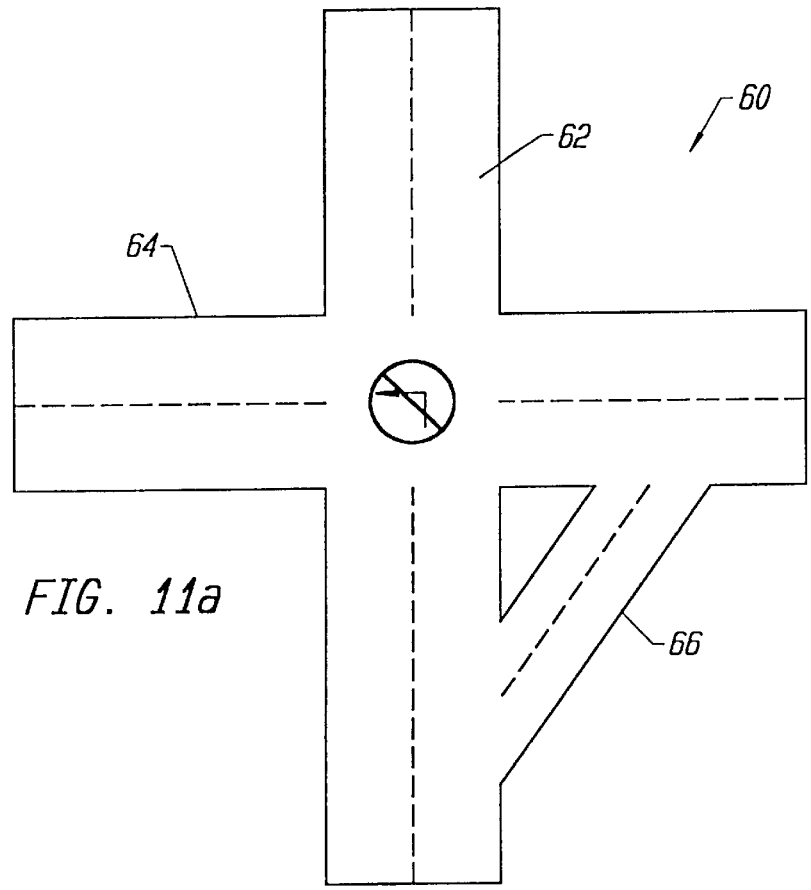
FIGS. 11(a) and 11(b) are representations of an intersection having a turn-lane connector wherein the turn-lane connector is not collapsible because it is critical to execution of the turn through the intersection.
Figure 11B:
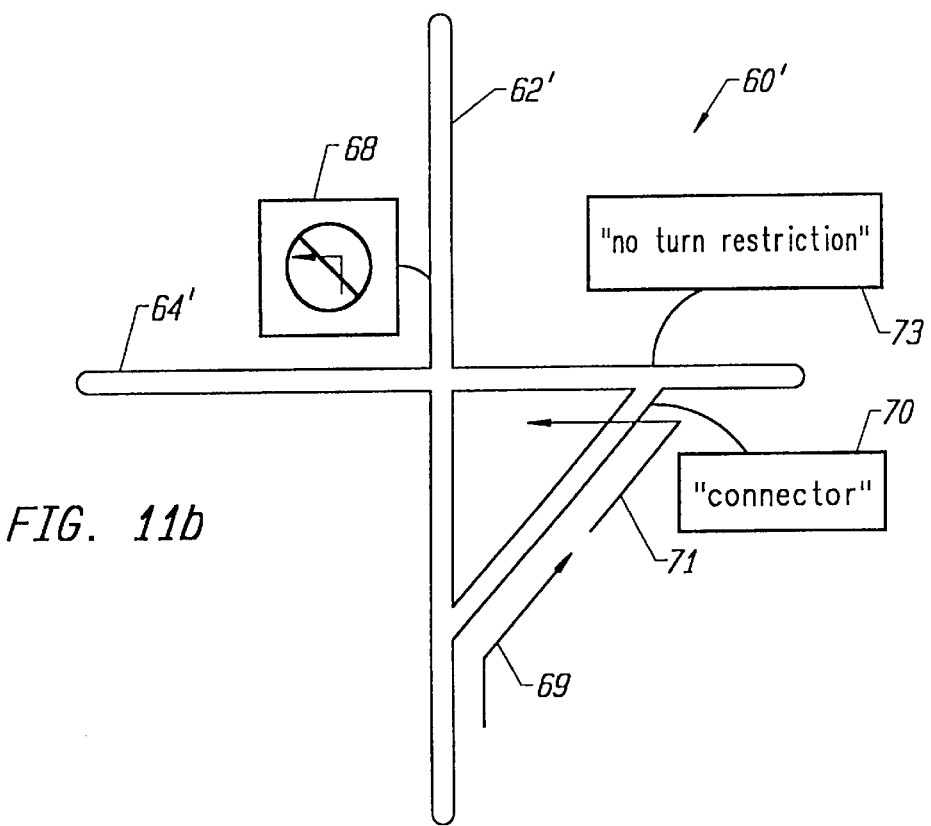

FIG. 10 is a flow chart of the method 400 for determining whether a turn lane connector is collapsible according to the present invention. A step 402 is an entry point for the method 400. At a step 404, the maneuver processor determines whether the turn lane connector is critical to execution of the required maneuver through the intersection. Referring to FIGS. 11(a) and (b), there are shown an example of one case (i.e., a "New Jersey Left") where a turn lane connector is not collapsible because it is critical for execution of the maneuver through the intersection. FIG. 11(a) is a representation of an intersection 60 including N/S street 62, E/W street 64, and turn lane 66. The intersection is represented in the map database as shown in FIG. 11(b) which includes a road 62' corresponding to N/S street 62, a road 64' corresponding to E/W street 64, and a short segment 66' corresponding to turn lane 66. The road attribute data for the intersection typically includes a left-turn restriction 68 for the junction of road 62' and road 64', a "connector" attribute 70 for short segment 66', and a "no turn restriction" 73 for the junction of short segment 66' with road 64'. In this case, to navigate from the northbound direction of N/S street 62 onto the westbound direction on E/W street 64 the maneuver processor generates a double maneuver indication as shown in the figure. That is, the maneuver processor generates a "slight right" indication 69, or equivalent, for the maneuver from road 62' onto connector 66', immediately followed by a "left turn" indication 71, or equivalent, for the maneuver from connector 66' onto road 64'. Because the turn lane connector is critical to execution of the maneuver, it cannot be collapsed into the main portion of the intersection for the purpose of maneuver generation. When this is the case, the maneuver processor indicates at a step 406 that the turn-lane connector is not collapsible by, for example, setting a "collapsible" variable to a "NO" value. If, however, the turn lane connector is not critical to execution of the maneuver, then the maneuver processor goes to step 408.

Figures 12A, 12B:
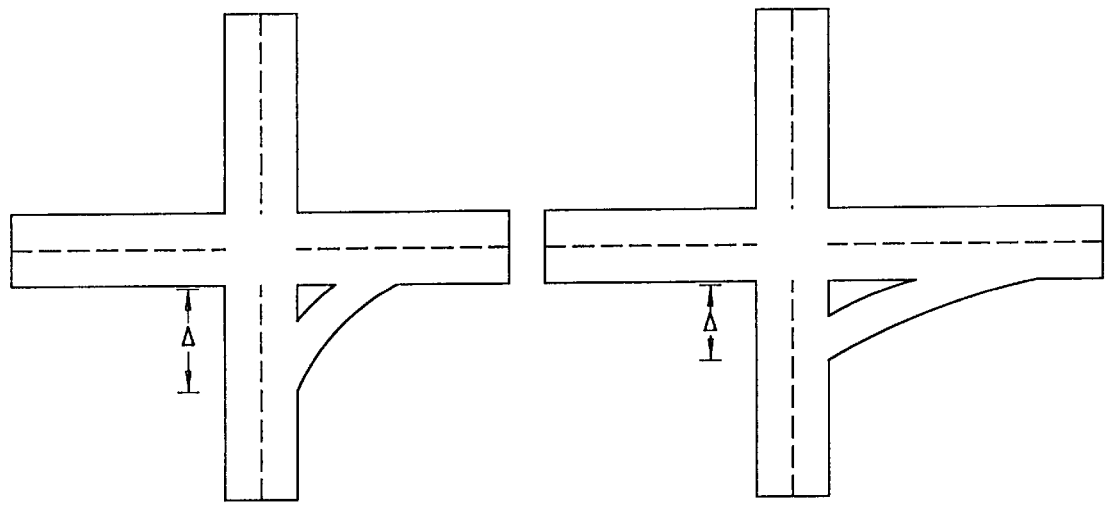
FIGS. 12(a)–12(d) are representations of four intersections, each having a turn lane, for demonstrating the remainder of the method of FIG. 10.
Figures 12C, 12D:
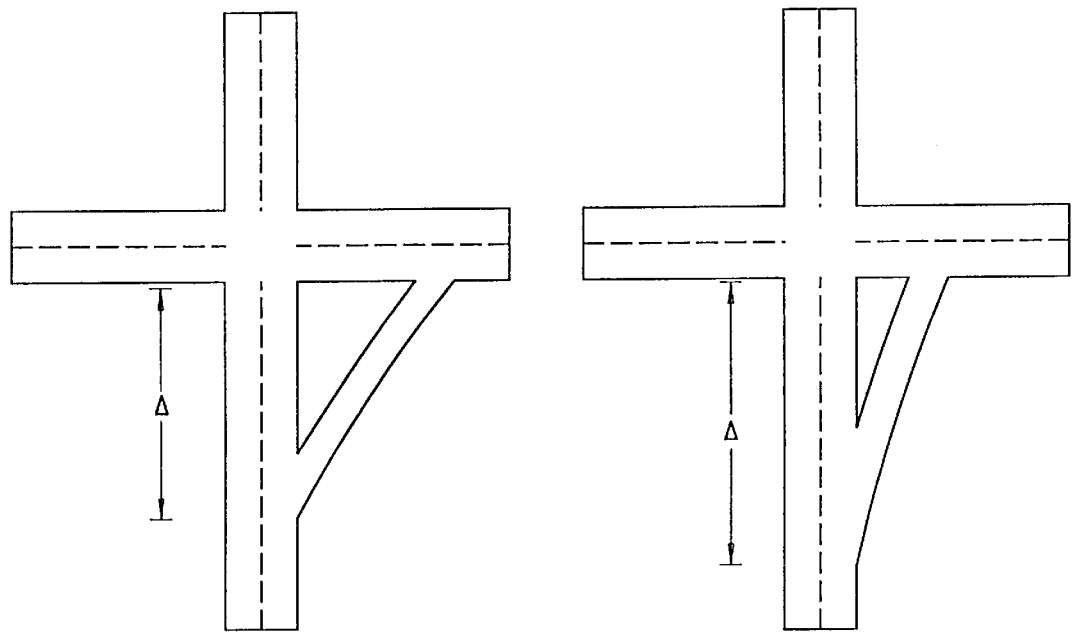

FIGS. 12(a)–12(d) are representations of four intersections having a turn lane for demonstrating the remainder of the method of FIG. 10. Referring to FIG. 10, the maneuver processor determines at a step 408 the distance, Δ, between the entry point of short segment 16 and the main intersection. The maneuver processor next determines at a step 410 whether the distance is less than a predetermine value, V1. If so, then we have the situation depicted in FIGS. 12(a) and 12(b). In this case, the maneuver processor indicates that the turn lane is collapsible at a step 412 by, for example, setting a "collapsible" variable to a "YES" value. Otherwise, the situation is as depicted in FIGS. 12(c) and 12(d). In this case, the maneuver processor indicates at a step 406 that the turn lane is not collapsible by, for example, setting the "collapsible" variable to a "NO" variable.

The method 600 of generating a maneuver indication for an intersection including a turn lane will be explained with reference to FIGS. 13(a)–(d). FIG. 13(a) is a representation of an intersection 72 where streets 74 and 76 meet at a sharp angle. The representation of intersection 72 in the map database is shown in FIG. 13(b), including a road 74' corresponding to street 74, and a road 76' corresponding to street 74. For this intersection, maneuver generator produces a "hard right" indication for the driver as shown in the figure. The "hard right" indication is consistent with the driver's perspective and suggests to the driver how the maneuver is to be executed. FIG. 13(c) is a representation of the same intersection including a turn lane 82. A representation of the intersection 80 in the map database is shown in FIG. 13(d), including a road 74' corresponding to street 74, and a road 82' corresponding to turn lane 82. Here, because of the turn lane, the driver's perspective of the maneuver is not a hard right, but that of a simple right as shown in the figure.

Figure 14:
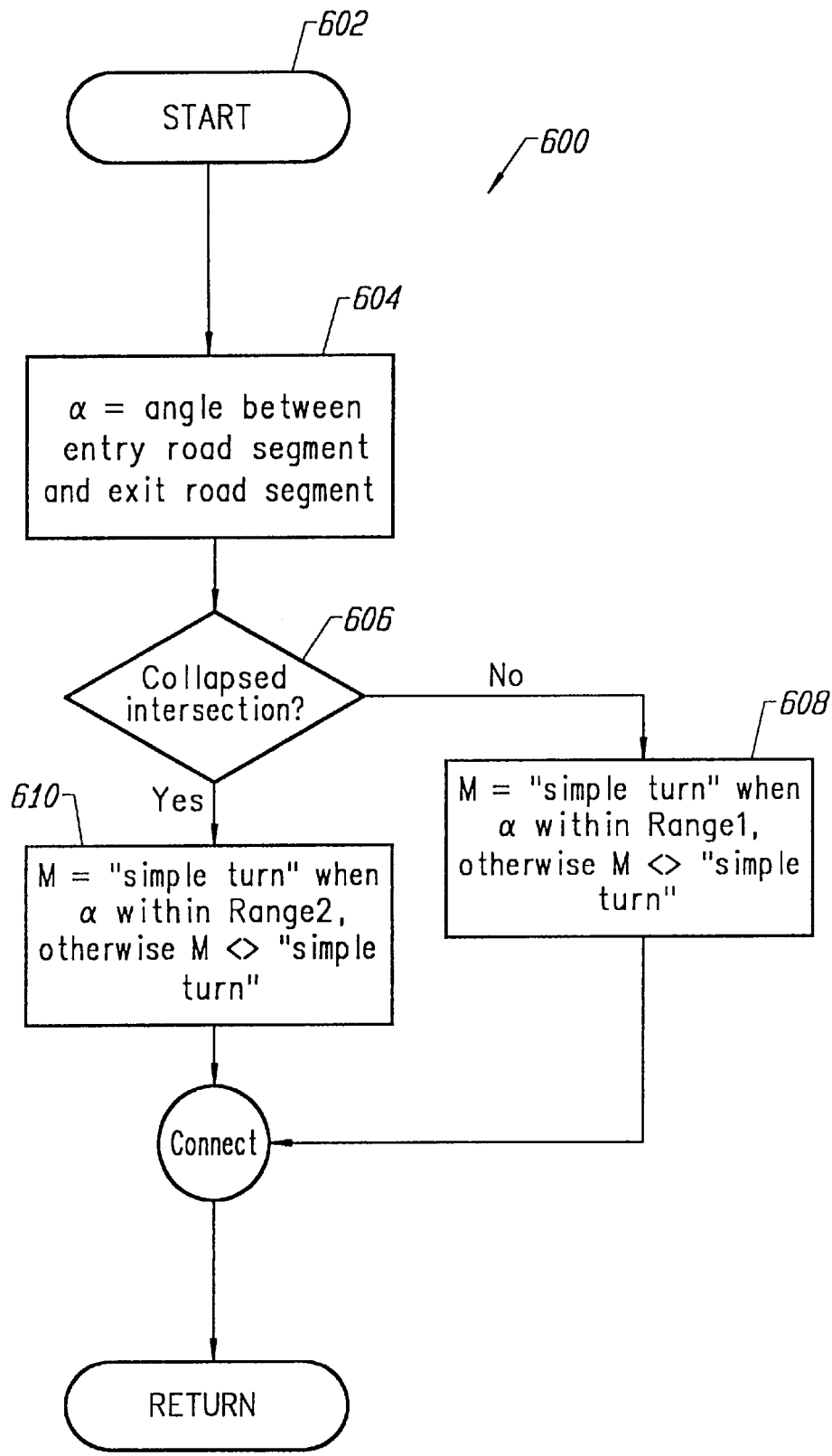
FIG. 14 is a flow-chart of the relevant portions of a method for generating one or more maneuver indications which correspond to the driver's perspective of the intersection according to the present invention.

FIG. 14 is a flow diagram of the relevant portions of the method 600 for generating one or more maneuver indications according to the present invention which produces the desired result shown in FIGS. 13(a)–(d). A step 602 is an entry point for method 600. The maneuver processor determines at a step 604 the angle, α, between the entry road segment 74' and the exit road segment 76' as shown in FIG. 13(*b*). At a step 606, the maneuver processor determines whether a turn lane has been collapsed into the intersection by, for example, testing a variable. If a turn lane has not been collapsed, then maneuver processor determines at step 608 whether or not to provide a simple turn indication by comparing α to range of values represented by the shaded portion of FIG. 15(*a*). For example, in the situation presented in FIG. 13(*b*), the maneuver processor will determine that a "hard right" indication is required. In the preferred embodiment, the range to which α is compared is from 60 degrees to 120 degrees relative to the bearing of the vehicle.

Figure 15A:
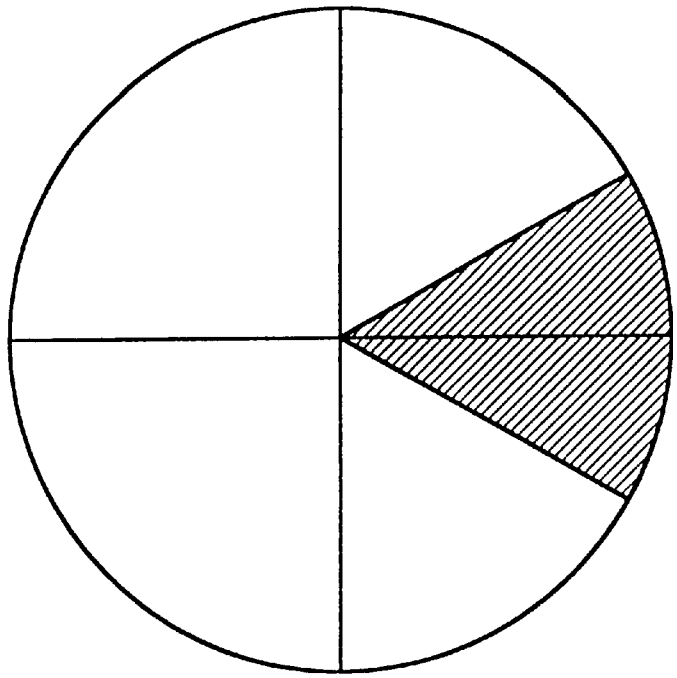
FIGS. 15(a) and 15(b) are diagrams illustrating the range of values used to determine when to provide a "simple turn" indication according to the present invention.
Figure 15B:
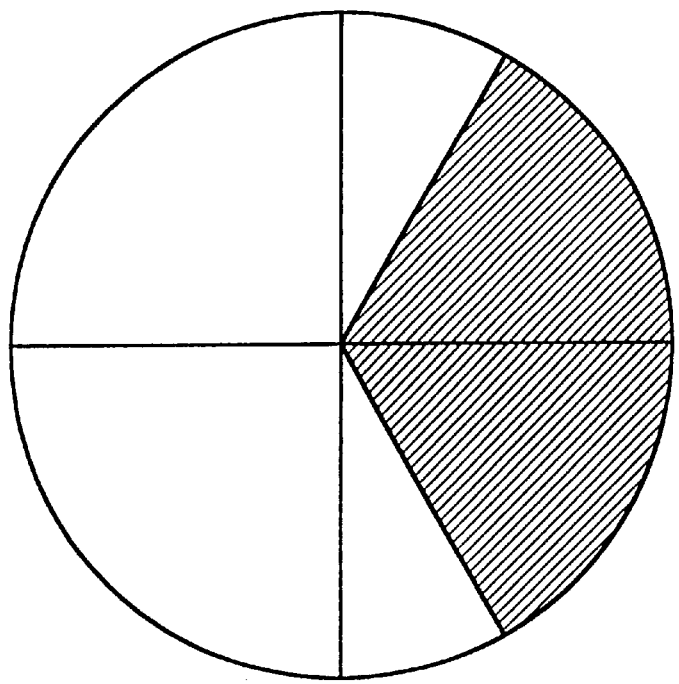

If, on the other hand, a turn lane has been collapsed into the intersection, then the maneuver processor determines at step 610 whether or not to provide a simple turn indication by comparing α to a range of values illustrated by a shaded portion of FIG. 15(*b*). For example, in the situation presented in FIG. 13(*d*), the maneuver processor will determine that a "simple right" indication is required. In the preferred embodiment, the range of values to which α is compared in this case if from 30 degrees to 150 degrees relative to the bearing of the vehicle.

Figure 16:
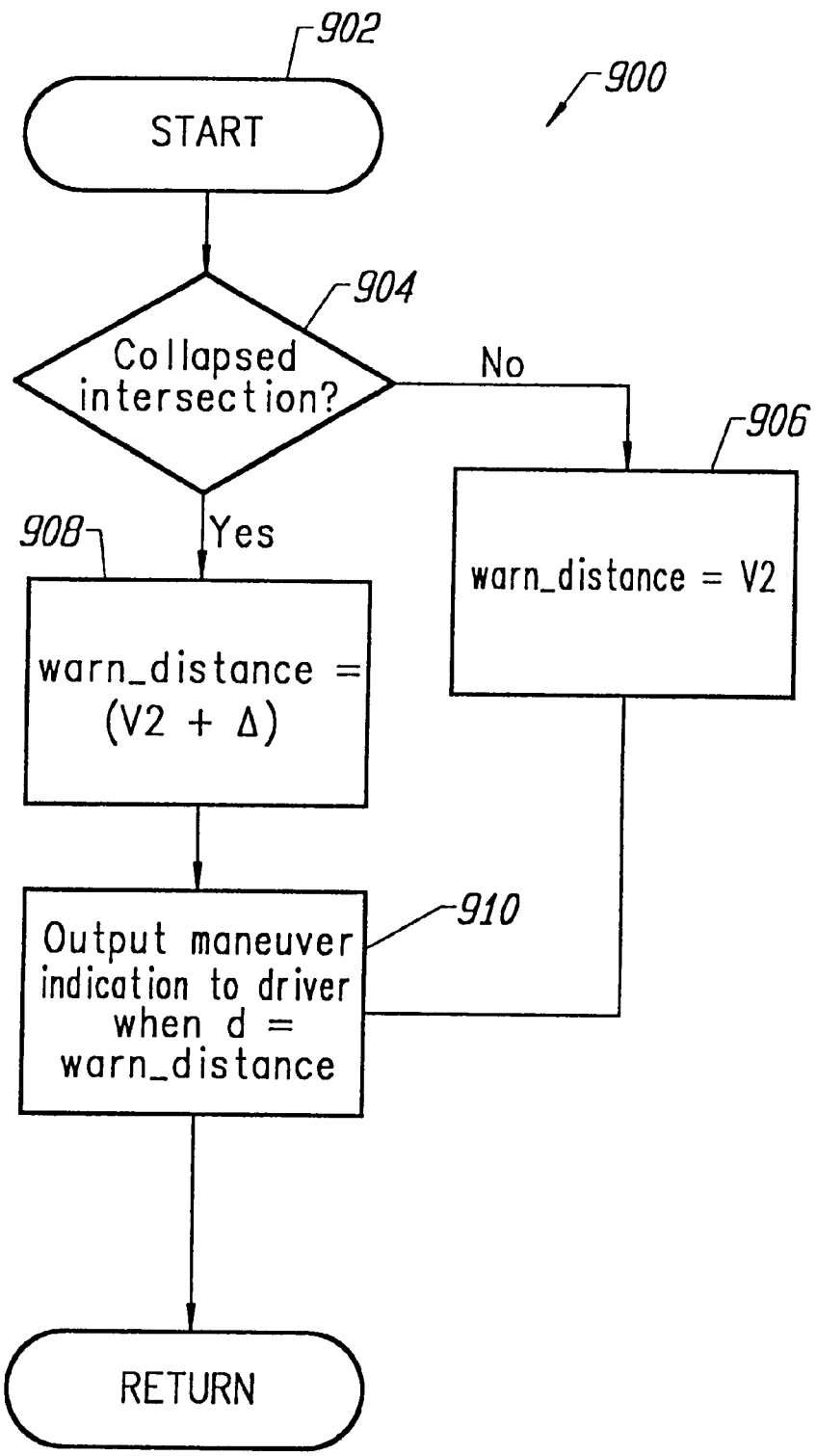
FIG. 16 is a flow-chart of the relevant portions of a method for outputting the one or more maneuver indications to a driver according to the present invention.
Figure 17A:
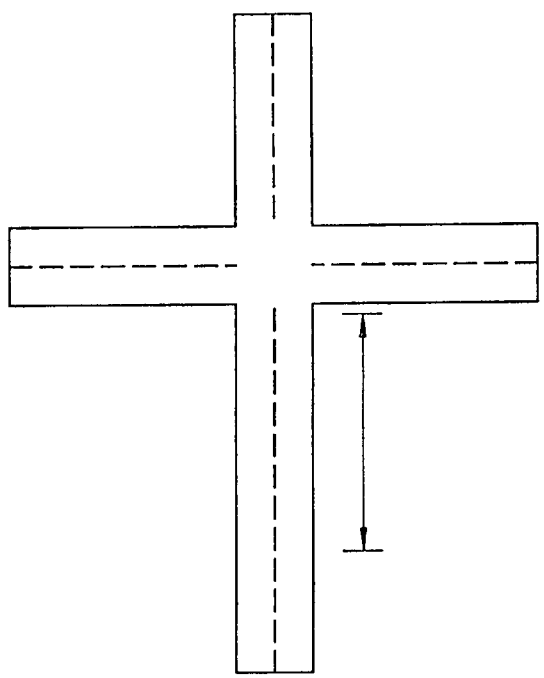
FIGS. 17(a) and 17(b) are representations of an intersection for demonstrating the method according to FIG. 16.
Figure 17B:
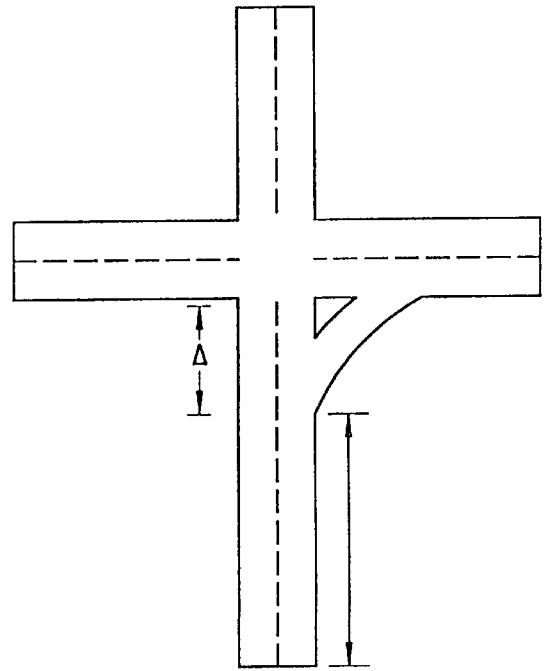

FIG. 16 is a flow chart of the relevant portions of the method 900 for outputting one or more maneuver indications to a driver according to the present invention. FIGS. 17(*a*) and 17(*b*) are representations of an intersections for demonstrating the method according to FIG. 16. A step 902 is an entry point for the method 900. The maneuver processor determines at step 904 whether the intersection is collapsed by, for example, testing a variable for that purpose. If the intersection is not collapsed, then the situation is as shown in FIG. 17(*a*). In this case, he maneuver processor at a step 906 sets the warning distance to be a predetermined amount, by, for example, setting a variable, "warn__distance" equal to a predetermined value, V2. If, conversely, the intersection is collapsed, then the situation is as shown in FIG. 17(*b*). In this case, the maneuver processor sets at step 908 the warning distance to be equal to a predetermined amount from the entry of the turn lane, by, for example, setting a variable, "warn__distance" equal to a value, V2+Δ, where Δ represents the distance of the entry point of the turn lane from the main intersection. At a step 910, the maneuver processor then outputs the one or more maneuver indications to the driver when the vehicle reaches a distance, d, equal to the warning distance set in the foregoing steps.

CONCLUSION

While the above is a complete description of the preferred embodiments of the invention, various alternative, modifications, and equivalents may be used. For example, instead of calculating a warning distance for determining when to provide the one or more maneuver indications to the driver, the maneuver processor could calculate a warning time which takes into consideration the speed of the vehicle. Therefore, the above description should not be taken as limiting the scope of the invention which is defined by the appended claims.

What is claimed is:

1. In a vehicle navigation system, a method for providing maneuver guidance for an intersection comprising:

a) retrieving information corresponding to the intersection from a map database;

b) determining from the information whether the intersection includes a turn lane;

c) where the intersection includes a turn lane reducing the information for generation of a simplified maneuver indication representing both the intersection and the turn lane; and d) generating the simplified maneuver indication.

2. The method of claim 1, further comprising:

e) outputting a representation of the maneuver indication to the driver.

3. The method of claim 2, wherein outputting the representation comprises:

calculating a warning time; and outputting the representation to the driver at the warning time.

4. The method of claim 3, wherein calculating a warning time comprises:

calculating a first warning time which corresponds to a vehicle being a predetermined distance from a main portion of the intersection when the intersection does not include a turn lane; and calculating a second warning time which corresponds to a vehicle being the predetermined distance from an entry point of the turn lane when the intersection does include a turn lane.

5. The method of claim 1, wherein the information includes road attribute data; and wherein determining whether the intersection includes a turn lane comprises recognizing when the road attribute data for the intersection includes a turn-lane connector road attribute.

6. The method of claim 1, wherein the information includes road positional data and road attribute data; and wherein determining whether the intersection includes a turn lane comprises analyzing the road positional data and the road attribute data.

7. The method of claim 1, wherein determining whether the intersection includes a turn lane comprises:

identifying one or more characteristic features of the intersection; and recognizing when the one or more characteristic features correspond to a pre-determined pattern of an intersection including a turn lane.

8. The method of claim 1, wherein determining whether the intersection includes a turn lane comprises:

generating maneuver indications for the intersection; and analyzing the maneuver indications and determining whether the maneuver indications correspond to an intersection including a turn lane.

9. The method of claim 8, wherein determining whether the maneuver indications correspond to an intersection including a turn lane comprises recognizing when the maneuver indications includes a double-maneuver indication.

10. The method of claim 1, wherein generating the simplified maneuver indication comprises:

determining a complexity of the turn lane;

generating a first set of maneuver indications for the intersection when the complexity of the turn lane is below a first complexity level; and generating a second set of maneuver indications for the intersection when the complexity of the turn lane is above the first complexity level.

11. The method of claim 10, wherein generating a second set of maneuver indications comprises:

reducing the information into collapsed intersection data, thereby simplifying the intersection; and generating, from the collapsed intersection data, the simplified maneuver indication.

12. The method of claim 10, wherein the intersection includes an entry road, a turn lane, and an exit road, and wherein determining the complexity of the turn lane comprises:

identifying an entry point for the turn lane; and calculating a distance between the entry point and the exit road.

13. The method of claim 1, wherein generating the simplified maneuver indication comprises:

determining whether the turn lane is critical for proper execution of a turn through the intersection;

generating a first set of maneuver indications for the intersection when the turn lane is critical for proper execution of a turn through the intersection; and generating a second set of maneuver indications for the intersection when the turn lane is not critical for proper execution of a turn through the intersection.

14. The method of claim 13, wherein generating a second set of maneuver indications comprises:

reducing the information into collapsed intersection data, thereby simplifying the intersection; and generating, from the collapsed intersection data, the simplified maneuver indication.

15. The method of claim 13, wherein the intersection includes an entry road, a turn lane, and an exit road, and wherein determining the complexity of the turn lane comprises:

identifying an entry point for the turn lane; and calculating a distance between the entry point and the exit road.

16. A computer program product for providing maneuver guidance for an intersection, comprising:

at least one computer-readable medium; and a computer program mechanism embedded in the at least one computer-readable medium for causing a computer to perform the steps of:

retrieving information corresponding to the intersection from a map database;

determining from the information whether the intersection includes a turn lane;

where the intersection includes a turn lane, reducing the information for generation of a simplified maneuver indication representing both the intersection and the turn lane; and generating the simplified maneuver indication.

17. A vehicle navigation system, comprising:

a user interface; and a processor coupled to the user interface, the processor being operable to:

retrieve information corresponding to an intersection from a map database;

determine from the information whether the intersection includes a turn lane;

where the intersection includes a turn lane, reducing the information for generation of a simplified maneuver indication representing both the intersection and the turn lane; and generate the simplified maneuver indication.

\* \* \* \* \*